Patented Mar. 29, 1938

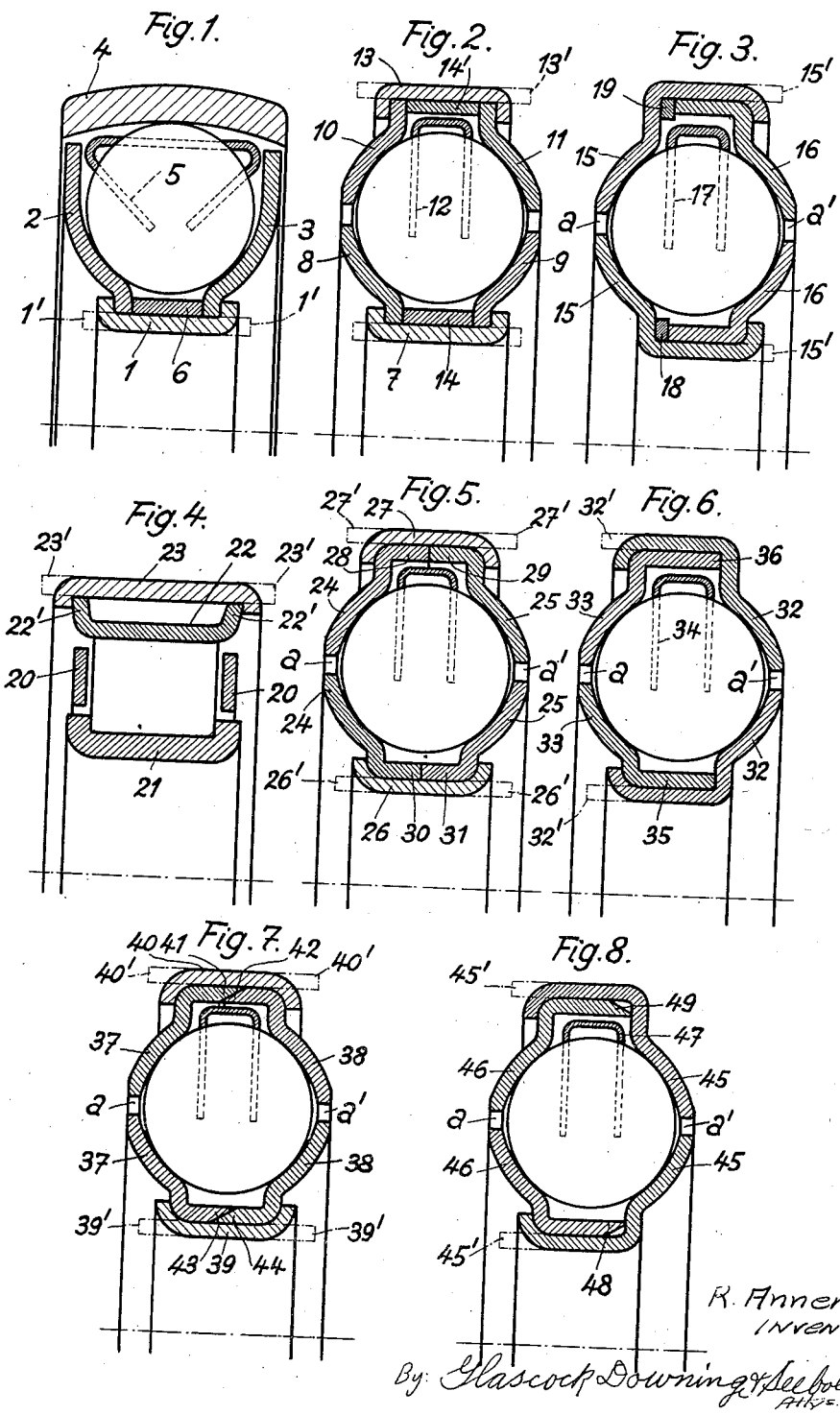

2,112,754

UNITED STATES PATENT OFFICE 2,112,754

METHOD OF MANUFACTURING BALL AND ROLLER BEARINGS

Robert Annen, Bienne, Switzerland, assignor to the firm Louis Muller & Cie S. A., Fabrique d'horlogerie "La Champagne", Bienne, Switzerland, a joint stock company of Switzerland Application December 26, 1935, Serial No. 56,286
In Switzerland December 26, 1934

5 Claims. (Cl. 29—148.4)

The machining of the race rings of ball and roller bearings is always very expensive because it requires a great precision and a perfect finish.

The method of manufacturing according to the present invention avoids this disadvantage and is characterized in that the regulation of the play of the race arrangement is effected by a permanent deforming of at least one member of this arrangement after this bearing has been completely assembled.

The annexed drawing represents as examples by fractional sections eight working forms of the method.

According to the Figure 1 the ring 1 maintains the race rings 2 and 3 in their normal working position. These races could be made of stamped sheet steel and are adjusted to the inner ring 1. After having forced the rings 2 and 6 upon the ring 1, the axis of the bearing being arranged perpendicularly to the mounting tool, the distance ring 5 with the balls is placed upon the ring 2, then the outer ring 4 is slipped over the whole. This latter ring in spite of its hollow form can be slipped over the distance ring 5 because the balls have a sufficient play. By a special operation the borders 1¹ of the ring 1 are bent up to seize the rings 2 and 3 and are compressed until the required play has been obtained for the efficient operation of the bearing. The rings 2, 3 and 4 supporting the pressures of the bearing are hardened. Due to this treatment the diameters of said rings have changed for several hundredths of millimeters more or less.

In taking these changes into account and in order to avoid a subsequent machining after the hardening the rings 2, 3 and 4 are assembled in such a way, that the bearing has always too much play. Then this play is regulated by compressing more or less the ring 6 which is the deformable member.

The bearing according to the Fig. 2 intended to support simultaneously the radial and axial stresses comprises a tube 7 to which the race rings 8 and 9 are riveted. One the outside of the bearing the ring 13 is bent up over the two race rings 10 and 11 and the hoops 14 and 14' representing the deformable members will be compressed more or less for regulating the bearing.

The arrangement represented by the Fig. 3 has an outer ring made in two pieces. In fact the rings 15, 15 are made first in one piece and cut in two at $a$, and likewise the ring 16, 16 has been cut in two at $a^1$ before being hardened. After having placed the rings 18, 19 and the distance ring 17 into the rings 15, 15 the rings 16, 16 are forced into the whole simultaneously. The rings 15, 15 are then flanged over the rings 16, 16. The regulation of the play is then made by a special operation, consisting in compressing one of the rings 18 and 19 or by compressing both.

The roller bearing of the Fig. 4 has its play regulated during the mounting by a permanent deformation of the race ring 22 by means of its flanged borders 22', 22'. The pressure of the hoop 23 on the borders 22', 22' of the race ring 22 suffices for diminishing the inside diameter of this race for several hundredths of millimeters. The distance ring 20 and the inner race ring 21 must be introduced into the rings 22 and 23 when the play is regulated.

In the Fig. 5 when the assembling of the bearing has been made, the regulation of the play is obtained by compressing more or less the rings 24, 24 and 25, 25 in the zones 28, 29, 30 and 31, which have been annealed previously after the hardening.

The bearing represented by the Fig. 6 is like that of Fig. 3, the rings 35 and 36 having been omitted. The race rings 32, 32 are annealed after the hardening at their tubular portions 32', 32' beaded at one border on the rings 33, 33. To the same thermic operation are subjected the portions 35, 36 which are the deformable portions of the rings 33, 33 and which are compressed for regulating the play.

The Figures 7 and 8 are bearings similar to those of the Figs. 5 and 6. In order to facilitate the deforming of the zones 41, 42, 43 and 44 of bearing in Fig. 7 these zones comprise each a conical portion permitting a slight gliding of these portions upon each other. This gliding suffices for giving an easy regulating of the races 37, 37 and 38, 38.

The conical portions 16" and 18" of these races 16, 18 of the Fig. 8 are sufficiently compressible to afford a good regulating of the play of the ball bearing.

What I claim is:—

1. Method of manufacturing ball bearings having race rings made of stamped sheet metal, said method consisting in forcing and riveting two half rings forming an inner race provided with compressible means between them upon an inner supporting ring, in placing the balls with the distance ring into this inner race, in placing the outer race symmetrically to the inner race leaving some clearance for the balls and finally in effecting the operative condition of the bearing by compressing said compressible means accordingly.

2. Method of manufacturing ball bearings having race rings made of stamped sheet metal, said method consisting in forcing and riveting two half rings forming an inner race provided with a compressible ring inserted between said two half rings upon an inner supporting ring, in placing the balls with the distance ring into this inner race, in placing two half rings having a compressible ring inserted between them and forming the outer race symmetrically to the inner race, in containing this outer race by an outer supporting ring while leaving some clearance for the balls, and finally in effecting the final operative condition of the bearing by compressing said compressible rings accordingly.

3. Method of manufacturing ball bearings having race rings made of stamped sheet metal, said method consisting in forcing and riveting two half rings forming an inner race and provided with compressible edges upon an inner supporting ring, in placing the balls with the distance ring into this inner race, in placing and riveting two half rings having compressible edges and forming the outer race upon said balls while leaving some clearance for the same, and finally in effecting the final operative condition of the bearing by compressing said compressible edges accordingly.

4. Method according to claim 1, consisting in that the compressible means forming portions of the race rings are suitably prepared by a thermical treatment.

5. Method according to claim 1, consisting in that the compressible means are formed by conically pointed edges of the race rings.

ROBERT ANNEN.